Figure 1:
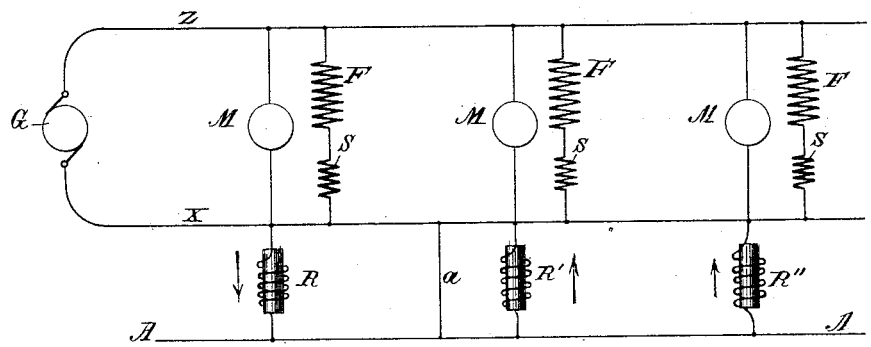

(No Model.)

W. STANLEY, Jr.
REGULATION OF ELECTRIC MOTORS.

No. 426,574. Patented Apr. 29, 1890.

WITNESSES:
Raphael Netter
William W. Buckley

INVENTOR
William Stanley Jr.
BY
Clarkson A. Collins
ATTORNEY

UNITED STATES PATENT OFFICE.

WILLIAM STANLEY, JR., OF GREAT BARRINGTON, MASSACHUSETTS.

REGULATION OF ELECTRIC MOTORS.

SPECIFICATION forming part of Letters Patent No. 426,574, dated April 29, 1890.

Application filed July 10, 1888. Serial No. 279,576. (No model.)

*To all whom it may concern:*

Be it known that I, WILLIAM STANLEY, Jr., a citizen of the United States, residing at Great Barrington, in the county of Berkshire and State of Massachusetts, have invented a new and Improved System of Regulation for Electric Motors, of which the following is a full and exact specification.

My invention relates to a system of electrical distribution of power in which a number of electromotors are connected in parallel arc. In such a system there is a decrease in electro-motive force throughout the circuit, the electro-motive force being greatest at the generator and least at that part of the circuit most remote from the generator. For this reason when all the motors in the system are carrying the same load there will be a difference in their speed proportional to their distance from the generator, that one which is nearest to the generator receiving current at the highest potential and running with the greatest speed.

To regulate the speed of the motors so that all the motors in a system, whatever their distance from the generator, and notwithstanding that current is supplied to them at different potentials, shall, when carrying the same load, run with the same speed, is the object of my improvements. This I accomplish in the following manner: At the electrical center of the system I attach to one of the main conductors a third wire, which extends from the point of attachment in each direction to the end of the circuit. This wire will have throughout its length the same potential that the main wire has at the point of attachment, so that at all points between the point of attachment and the generator the potential of the third wire will be lower than that of the main, and at all points between the point of attachment and the farther end of the circuit the potential of the third wire will be greater than that of the main, and the difference of potential between the main at any point and the third wire will be the same as the difference in potential between the main at that point and at the electrical center of the system or point at which the third wire is attached to the main; hence if the third wire be connected with the main at other points along its length there will at each point of connection between the generator and the center of distribution be a flow of current from the main to the third wire and at each point of connection beyond the center of distribution there will be a flow of current from the third wire to the main. Upon each motor is placed a regulating-coil, having one terminal connected to the main at the point from which the current operating the motor is taken and the other connected to the third wire. Through the regulating-coils of all the motors supplied with current at an electro-motive force higher than the electro-motive force at the electrical center of distribution current flows in such a direction as to increase the magnetism of the field, and hence reduce the speed of the motors, and through the regulating-coils of all the motors supplied with current at an electro-motive force lower than the electro-motive force at the electrical center of distribution current flows in such a direction as to diminish the magnetism of the field, and hence to increase the speed of the motor, and since the electro-motive force at which current is supplied to each regulator-coil is equal to the difference between the electro-motive force at the electrical center of distribution and the electro-motive force at which current is supplied to the motor to which the coil is attached, all the motors of the system will, when carrying the same load, run at the same rate of speed.

The invention is illustrated in the drawings, in which—

Figure 2:
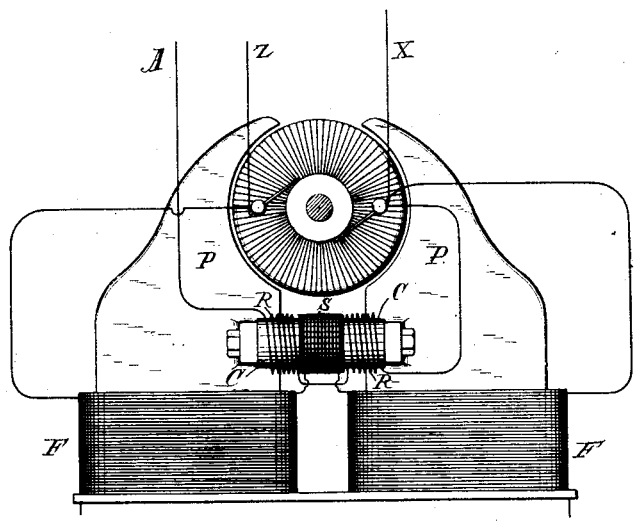

Figure 1 represents a diagram of the system, and Fig. 2 shows the manner of applying the regulating-coil to a motor.

The same letters of reference indicate corresponding parts.

G is the generator, from which extend mains *x z*, between which are connected electromotors M M' M''.

*a* is a point on the main *x*, which is at the electrical center of distribution.

F F are the field-coils of a motor, which are connected in a shunt to the armature, and P P are the pole-pieces of the field-magnets.

Between the pole-pieces P P, and attached to them by bolts or in any other suitable manner, extends the iron core C, upon which is wound the regulating-coil R. Upon the core C is also wound the coil S, which is connected in series with the field-coils and prevents the magnetic lines of force in the pole-pieces from passing through the core C, instead of through the armature. The terminals of the coil R are connected, one to the main $x$ at or near the point from which current is taken for the motor and the other to the wire A. The terminals of the coil R are so connected that when current is flowing through the coil from the main $x$ to the wire A (*i. e.*, at all points between the generator and the point $a$ on the main) the effect of the current flowing through the coil will be to intensify the magnetism of the field pole-pieces P P, and hence to decrease the speed of the motor, and, on the other hand, when current is flowing through the coil R from the wire A to the main $x$ (*i. e.*, at all points beyond the point $a$ on the main) the magnetic effect of the current in the coil will be opposed to the magnetism of the field, and hence the speed of the motor will be increased. In either case the electro-motive force of the current passing through the coil R will be that between the wire A and the main $x$ at that point at which the coil R is connected to it, and all the motors in circuit will, when carrying the same load, run at the same speed with which a motor would run if in circuit between the mains at the point $a$. If the potential of the main at the point $a$ be kept constant, as may be done by means of devices described in another application for Letters Patent filed by me of even date herewith, then all the motors in the system will, when under constant load, run at a constant speed and will not be affected by the rise or fall of potential at the generator.

In the foregoing description it has been assumed that the potential of the wire A will be the same in all its parts. While this would not be precisely the case, still the loss of potential would be so small that for all practical purposes it may be entirely disregarded.

What I claim as new, and desire to secure by Letters Patent, is—

1. The combination of a generator of electricity, mains leading therefrom, electromotors in circuit between the mains, a third wire attached to one of the mains at the electrical center of distribution, and regulating-coils upon the motors connected between the third wire and the main to which it is attached, substantially as and for the purposes set forth.

2. In a system of electrical distribution, the combination of a generator of electricity, mains leading therefrom, a third wire connected to one of said mains, electric motors in circuit between the mains, and upon each motor a magnetic shunt between the pole-pieces of the field-magnets around the armature, and a coil of wire upon the shunt having its terminals connected, the one to said third wire and the other to the main with which said third wire is connected.

3. The combination of a generator of electricity, mains leading therefrom, electromotors in circuit between the mains, a third wire connected to one of the mains at the electrical center of distribution, and upon each motor a core spanning the space between the pole-pieces, a coil of wire in series with the field-coils wound upon the core, and a regulating-coil upon the core in circuit between the third wire and the main to which the third wire is attached, substantially as set forth, and for the purposes indicated.

4. The hereinbefore-described method of equalizing the speed of electric motors situated at different distances from a common source of electricity, which consists in developing a flow of current by means of the drop in potential upon the line between each motor and the generator, and causing such currents to traverse regulating-coils upon the motors in a direction determined in the case of each motor by the distance of such motor from the generator.

In testimony whereof I have hereunto subscribed my name this 29th day of June, A. D. 1888.

WILLIAM STANLEY, Jr.

Witnesses:
FREDCK. N. DELAND,
BENJ. BARKER, Jr.